June 6, 1961  J. P. WEAGANT  2,987,324

VEHICULAR STEERING-COUPLING DEVICE

Filed Oct. 28, 1959  4 Sheets-Sheet 1

INVENTOR
JOHN PARKER WEAGANT
BY
ATTORNEYS

June 6, 1961  J. P. WEAGANT  2,987,324
VEHICULAR STEERING-COUPLING DEVICE
Filed Oct. 28, 1959  4 Sheets-Sheet 4

INVENTOR
JOHN PARKER WEAGANT
BY
ATTORNEYS

United States Patent Office 2,987,324
Patented June 6, 1961

2,987,324
VEHICULAR STEERING-COUPLING DEVICE
John P. Weagant, Owen Sound, Ontario, Canada, assignor to Weagant Coupling Limited, Toronto, Ontario, Canada, a company of Ontario
Filed Oct. 28, 1959, Ser. No. 849,217
10 Claims. (Cl. 280—448)

This invention relates to a vehicular steering-coupling device and in particular to a mechanism which, when employed for coupling a non-powered vehicle, hereinafter referred to as the coupled vehicle, to a powered vehicle, such as a motor car, truck, tractor, etc., hereinafter referred to as the motive vehicle, will steer the coupled vehicle along substantially the same straight line or curvilinear path as the motive vehicle is describing whether moving in a forward or backward direction. When the coupled vehicle is attached in front of the motive vehicle as opposed to pulling or when the coupled vehicle is attached to the rear of the motive vehicle as in normal towing application, the direction of travel for both cases is identical.

The motive vehicle may be a passenger motor car, truck, tractor, etc., and the coupled vehicle may be a piece of machinery such as a lawn mower, a two wheeled trailer, or other agricultural implement, etc.

The axis of symmetry herein referred to is the longitudinal axis of symmetry which is an imaginary line bisecting the distance between the wheels of the coupled vehicle and preferably the projection thereof to bisect the distance between each pair of wheels of the motive vehicle.

Coupling devices as presently in use for attaching a coupled vehicle to a motive vehicle are impractical for pushing the coupled vehicle because of the fact that the coupled vehicle tends to turn excessively in the direction of turn or more frequently opposite to the direction of turn of the motive vehicle. Consequently, when the operator of vehicles so coupled decides to push the coupled vehicle into a selected position, he has great difficulty in maneuvering the coupled vehicle into the direction in which he wishes it to go. That is true whether the operator wishes to push the coupled vehicle in a straight line or to turn the coupled vehicle along a chosen curvilinear path.

The object of the present invention is to provide a vehicular steering-coupling device which will overcome the difficulty already mentioned and which will automatically turn the coupled vehicle in the same direction as the operator turns the motive vehicle.

Another feature of the vehicular steering-coupling device is that if the motive vehicle changes its path from one curve to another or to a straight line path, or from a straight line path to a curved path, the device will respond automatically to turn the coupled vehicle in the same path as the motive vehicle. This is an important advantage of the present invention over the prior art couplings which, when a pushing force is applied to the coupled vehicle, do not respond correctly and in the proper manner to a change of direction of the motive vehicle.

These and other objects are accomplished by the vehicular steering-coupling device of the present invention for the steering of a coupled vehicle whether the coupled vehicle is being pushed or pulled by the motive vehicle.

The vehicular steering-coupling device of the present invention comprises a drawbar having a coupling on its free outer end adapted for attachment to a complemental member fixed on the axis of symmetry of the motive vehicle, the said coupling and complemental member having movement relative to each other only in response to irregularities in the surface over which the vehicles travel but have unitary movement in response to a turning moment laterally applied caused by the turning of the motive vehicle, the other end of the drawbar terminating in a crossbar having a pair of arms extending from the end of the crossbar parallel to the drawbar and equi-distant therefrom, a member attachable to the coupled vehicle centrally on the axis of symmetry and having a component on each side of said axis, each component being angulated relative to said axis, the components forming an included angle bisected by the said axis and the opening of which angle faces in the direction of the pushing motion of the coupled vehicle, means for providing a sliding connection between the arms of the crossbar and the adjacent components of the fixed member, whereby during a straight line motion of the motive vehicle the drawbar is in line with the axis of symmetry bisecting the included angle and no turning moment is applied to the fixed member and during a curvilinear motion of the motive vehicle, the drawbar will be shifted laterally by the complemental member to apply a turning moment to the fixed member in the direction of turn of the motive vehicle and thereby steer the coupled vehicle substantially along the curve described by the motive vehicle.

For other and further features of the invention, reference is to be had to the following description and the accompanying drawings illustrating the same and in which FIGURE 1 is a plan view of the device showing it attached to a coupled vehicle, the parts being shown in the position which they assume when the coupled vehicle is being pushed along a curved path, by the motive vehicle.

FIGURE 4 is a plan view illustrating the motive vehicle and the coupled vehicle moving forward in a turn while

Figure 1:
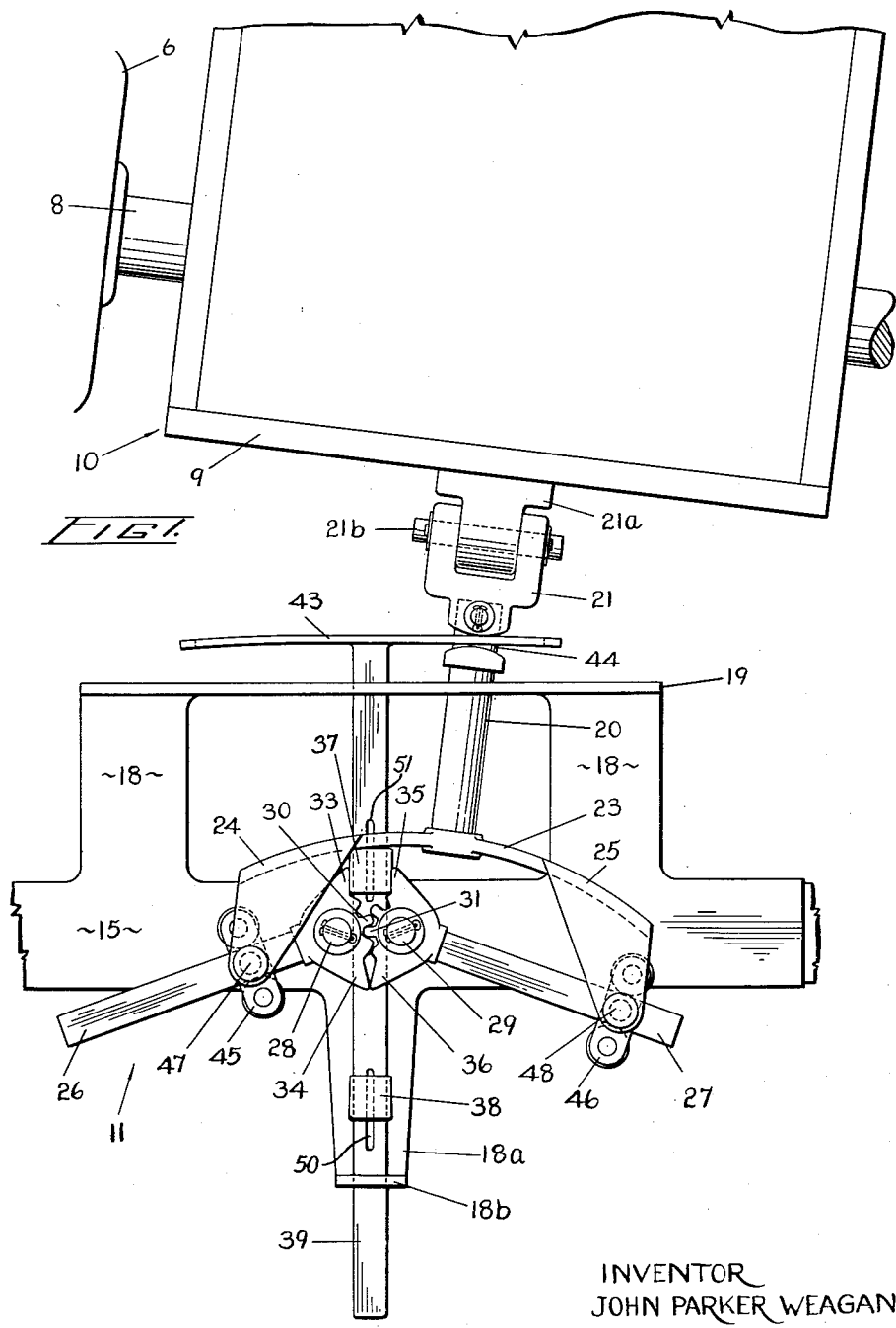
Figure 2:
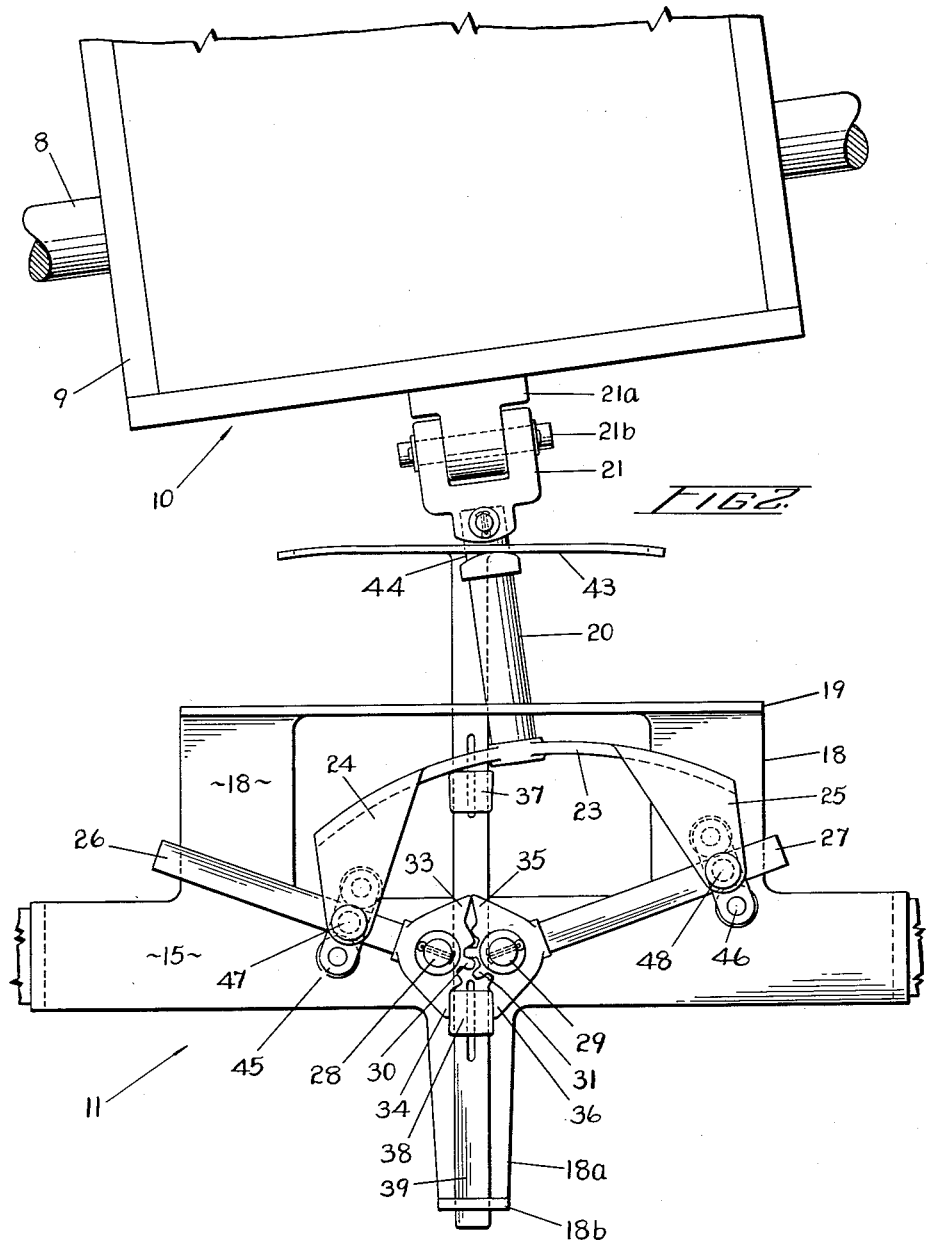
FIGURE 2 is a plan view, similar to FIGURE 1 but with the parts shown in position when being pulled.

For the purpose of illustrating the operation of the device, it will be described in conjunction for coupling a lawn mower (coupled vehicle) to a tractor (motive vehicle).

It is, of course, to be understood that in so describing the vehicular steering-coupling device, it is solely for the purpose of illustrating the construction and operation of the mechanism and is not to be taken in any respect to limit the invention to that particular application. It will be obvious that the invention can be applied equally well to couple, for example, a two-wheeled boat trailer to a passenger motor vehicle.

The motive vehicle (a tractor) is identified by the reference numeral 10 and the coupled vehicle (lawn mower) by the numeral 11, which are coupled together by the mechanism of the present invention which will now be described. Only such parts of these vehicles are shown as are necessary for explaining the invention. These parts comprising chassis 9, rear axle 8, rear wheels 6, 7 of the motive vehicle, and lawn mower axle 12 which carries wheels 13, 14.

A simple mounting for the coupling includes a base 15 extending crosswise of the mower, the base having bearings 16, 17, one at each end, in which the axle 11 is journalled. The base is formed with a forwardly extending portion 18, having an upturned end 19 which has an elongated horizontal slot 19a. The base is also provided with a rearwardly extending arm 18a having an upturned end 18b. The arm 18a is located on the axis of symmetry of the mower.

The steering-coupling device comprises a drawbar 20 projecting through the slot 19a and is laterally moveable therein as hereinafter described. Mounted on the outer end of the drawbar is a clevis assembly 21 which is adapted for attachment to a coupler 21a by means of a coupling bolt 21b. The coupler 21a is securely attached to the frame of the motive vehicle, preferably on the axis of symmetry. The clevis assembly 21 is mounted on the end of the drawbar so that it is free to rotate about the longitudinal axis of the drawbar and free to pivot up and down about the coupling bolt 21b to prevent any force being transmitted to the drawbar and in turn to the coupled vehicle due to any angular misalignment in the horizontal plane between the two vehicles, such as unevenness in the ground surface. However, the union between the clevis assembly 21 and the coupler 21a on the motive vehicle is such that both parts move as a unit laterally when the motive vehicle is turned to change direction and will move to align with the axis of symmetry extending longitudinally through both vehicles when the motive vehicle has straight line motion. The other end of the drawbar is provided with a crossbar 23 which terminates at each end in arms 24, 25 of equal length and spaced equi-distant from the drawbar and extending parallel thereto.

The arms 24, 25 are connected to a pivotal member having a component on each side of the axis of symmetry. In the embodiment illustrated, the components consist of a pair of guide bars 26, 27 which have their adjacent ends pivotally mounted on posts 28, 29, respectively, secured to and rising perpendicular from the base 15. The posts 28, 29 are positioned equi-distant on either side of the axis of symmetry. In order to allow for free sliding movement between the arms 24, 25 and guide bars 26, 27, sliders or glides 45, 46 are slidably mounted on the guide bars and pivotally mounted on the free end of the arms 24, 25, respectively, by means of the pivots 47, 48. As will be seen, the arms are angulated relative to the axis of symmetry which bisects the included angle formed by the two guide bars. The radius of turn of the coupled vehicle will be determined by the angle of the guide bars. In the present construction, the included angle is approximately 150° and for pulling motion the guide bars must pivot towards the motive vehicle to be at least in a straight line or a locking mechanism provided which will lock the drawbar against lateral movement for pulling motion. It is, of course, preferable that the included angle for pulling motion be the same as the included angle for pushing motion.

In order that the guide bars 26, 27 will move as a unit in the manner hereinafter described, the adjacent ends are provided with engaging gear teeth 30, 31, respectively, the teeth 30 being disposed between a pair of shoulders 33, 34, and the teeth 31 between a pair of shoulders 35, 36, between which shoulders, depending on the direction of the movement, the locking blocks 37, 38 are engaged as hereinafter described. The locking blocks 37, 38 are mounted for limited sliding movement on an actuating lever 39 mounted for sliding movement in the base, the shoulders and the blocks combining to prevent spurious pivotal movement of bars 26, 27. For that purpose the actuating lever is formed with a pair of spaced apart slots 50, 51, the blocks 37, 38 each being provided with a slot engaging extension 52 which not only guides the blocks when they are moved as hereinafter described, but retains the blocks in their assembled position. The actuating lever registers with the axis of symmetry and is slidably supported for reciprocating movement along said axis by the upturned ends 18b and 19.

Figure 3:
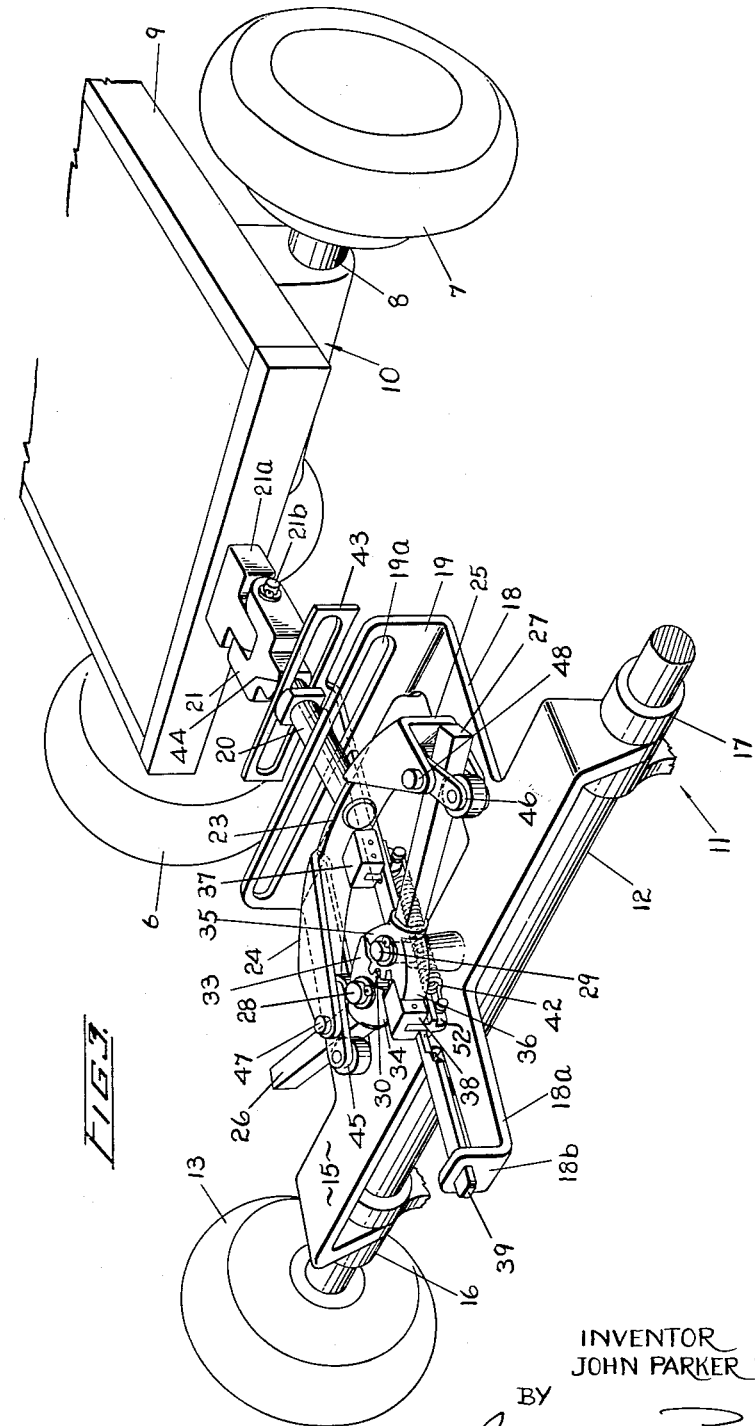
FIGURE 3 is a perspective view of FIGURE 2.
Figure 4:
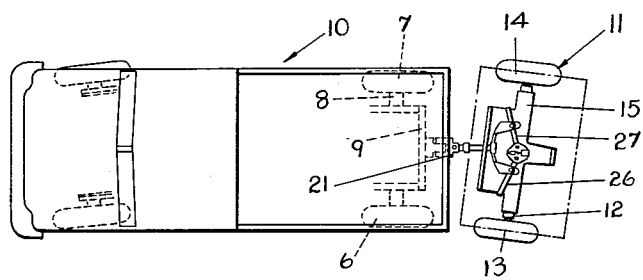
Figure 5:
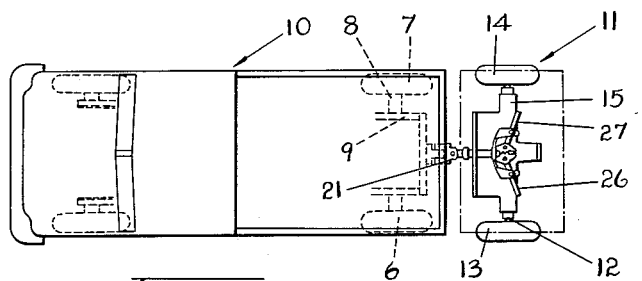
FIGURES 5 and 6 show the coupled vehicle being pushed by the motive vehicle in a straight line and in a curved path respectively.
Figure 6:
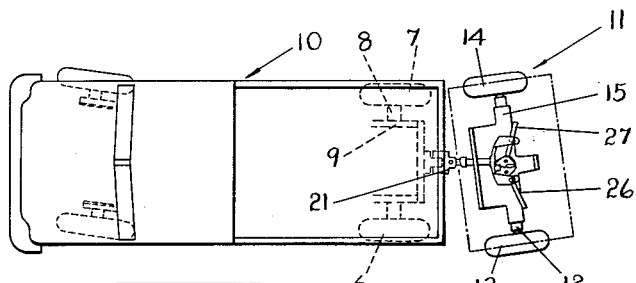

As will be clearly seen in FIGURE 3, the locking blocks 37, 38 are slidably mounted on the actuating lever 39, for limited movement, the blocks being pulled toward each other by tension spring 42. It will be seen from the drawings that, when the shoulders 33, 35, for example, are completely separated that the opposed faces are substantially parallel and that the faces of the block 37 which are engaged therebetween are also substantially parallel, thus eliminating the possibility of movement of the block under the force applied to guide bars 26, 27. The type of mounting, as described, ensures the engagement of the locking blocks 37, 38 between one set of shoulders 35, 36, or the other set 33, 34, dependent on the direction of motion. In order that the actuating lever 39 may be operatively connected to the drawbar 20, the actuating lever 39 has its outer end provided with a substantially straight bar 43 which rides in the slot or groove 44 formed on the drawbar.

In FIGURE 1, the device is shown in the position which the parts assume when the coupled vehicle is being pushed by the motive vehicle. In that position the included angle between the arms 26, 27, faces in the direction of motion in which the coupled vehicle is being pushed by the motive vehicle and the locking block 37 will be engaged between the shoulders 35, 36, with the shoulders 34, 36, in engagement, thus positively locking the arms 26, 27 against any spurious pivotal movement. The motive vehicle is assumed to be turning to follow a counterclockwise turn which has shifted the drawbar laterally in the same direction thereby applying a turning moment to the fixed member causing the coupled vehicle to turn in the same direction. If the operator then reverses the direction of the motive vehicle in order to pull the coupled vehicle, the actuating lever 39 will also be pulled forward which movement will release the locking block 37 from between the shoulders 34, 36, leaving the guide bars 26, 27, free to turn on their pivots to form a negative included angle opposite to the included angle for the pushing motion. Simultaneously, the shoulders 33, 35 will be separated and as soon as their separation is sufficient to allow the locking block 38 to slip into position between the shoulders 33, 34, the latter does so under the influence of the tension spring 42.

It will be seen from the foregoing description that when the motive vehicle is turned, the sliders will move along the guide bars under the influence of the drawbar moment until the coupled vehicle is aligned with respect to the motive vehicle in such manner that the static moment of the force applied by the sliders along the guide bars about the pivots 28, 29, is sufficient to hold the coupled vehicle on the required curved path and the pivot forces have no resultant moment along the guide bars. Furthermore, having reference to a forward curvilinear motion, the wheels of a two-wheeled trailer would be aligned in the same direction as the front wheels of the vehicle towing it.

During straight line motion of the motive vehicle when coupled to a coupled vehicle for either pushing or pulling, the drawbar is in line with an axis of symmetry bisecting the included angle between the guide bars. Consequently, the force through the drawbar and the sliders is applied at equal distances from the pivots 28, 29. Thus there is no resultant moment present and the coupled vehicle will continue in a straight line motion.

The casing for the vehicular steering-coupling device has been omitted from the disclosure for purpose of clarity. It will, of course, be understood that the device would, in accordance with good practice, be enclosed by a casing or shroud.

What I claim as new and desire to protect by Letters Patent of the United States is:

1. A vehicular steering-coupling device for steering a coupled vehicle in the direction of a motive vehicle to which it is coupled comprising a drawbar having a coupling on its free outer end adapted for attachment to a complemental member fixed on the axis of symmetry of the motive vehicle, said coupling and complemental member having movement relative to each other only in response to irregularities in the surface over which the vehicles travel but having unitary movement in response to a turning moment applied laterally in the direction of turn of the motive vehicle, the other end of the drawbar terminating in a crossbar and a pair of arms extending parallel to the drawbar and equi-distant therefrom, a pivotal member attachable to the towed vehicle centrally on the axis of symmetry and having a component on each side of said axis, each component being angulated relative to said axis, the two components forming an included angle bisected by the said axis and the opening of which angle faces in the direction of motion of the motive vehicle, a pivotal mounting for said member permitting said member to move in response to a reversal in the direction of motion of the motive vehicle to form a negative included angle opposite to the first mentioned included angle, means for slidably and pivotally connecting the arms to the adjacent portion of the components of the pivotal member, whereby during a straight line motion of the motive vehicle the drawbar is in line with the axis of symmetry bisecting the included angle and no turning moment is applied to the fixed member, and during a curvilinear motion of the motive vehicle the drawbar will be shifted laterally by the complemental member to apply a turning moment to the components in the direction of turn of the motive vehicle and thereby steer the coupled vehicle substantially along the curve described by the motive vehicle, and an interlock operatively connected to said drawbar for positively locking said pivotal member in the position which it assumes by the line force applied thereto.

2. A vehicular steering-coupling device for steering a coupled vehicle substantially in the same direction of the motive vehicle to which it is attached comprising a drawbar having a coupling on its free outer end adapted for attachment to a complemental member fixed on the axis of symmetry of the motive vehicle, said coupling and complemental member having movement relative to each other only in response to irregularities in the surface over which the vehicles travel but having unitary movement in response to a turning moment applied laterally in the direction of turn of the motive vehicle, a crossbar fixed on the other end of the drawbar terminating in a pair of arms extending parallel to the drawbar and equi-distant therefrom, a pivotal member mounted on each side of the axis of symmetry, each pivotal member being angulated relative to said axis and forming an included angle bisected by the said axis the opening of which angle faces in the direction of motion of the motive vehicle and being turned on its pivot in response to a reversal in the direction of motion of the motive vehicle to form a negative included angle opposite to the first mentioned included angle, means carried on each arm for slidably and pivotally connecting it to the contiguous pivotal member, whereby during a straight line motion of the motive vehicle the drawbar is in line with the axis of symmetry bisecting the included angle whereby no turning moment is applied to the pivotal members and during a curvilinear motion of the motive vehicle the drawbar will be shifted laterally by the complemental member to apply a turning moment to the pivotal members in the direction of turn of the motive vehicle and thereby steer the coupled vehicle substantially along the curve described by the motive vehicle, and an interlock operatively connected to said drawbar for positively locking said members in the position which they assume by the line force applied thereto.

3. A vehicular steering-coupling device for steering a coupled vehicle in the same direction as the motive vehicle to which it is coupled comprising a drawbar having a coupling on its free outer end adapted for attachment to a complemental member fixed on the axis of symmetry of the motive vehicle, said coupling and complemental member having movement relative to each other only in response to irregularities in the surface over which the vehicles travel but having unitary movement in response to a turning moment applied in the direction of turn of the motive vehicle, a crossbar fixed on the other end of the drawbar at right angles thereto and having an arm at each end equi-distant from and parallel to the drawbar, a base arranged for attachment to the coupled vehicle on the longitudinal axis of symmetry, a pivotal member positioned centrally on the axis of symmetry and having a component on each side of said axis, each component being angulated relative to said axis, the two components forming an included angle bisected by the said axis and the opening of which angle faces in the direction of motion of the motive vehicle, a pivotal mounting for said member permitting said member to move in response to a reversal in the direction of motion of the motive vehicle to form a negative included angle opposite to the first mentioned included angle, means carried on each arm slidably and pivotally connecting it to the contiguous components of the pivotal member whereby during a straight line motion of the motive vehicle the drawbar is in line with the axis of symmetry bisecting the included angle whereby no turning moment is applied to the components and during a curvilinear motion of the motive vehicle the drawbar will be shifted laterally by the complemental member to apply a turning moment to the components in the direction of turn of the motive vehicle and thereby steer the coupled vehicle substantially along the course of the motive vehicle, and an interlock operatively connected to said drawbar for positively locking said pivotal member in the position which it assumes by the line force applied thereto.

4. A vehicular steering-coupling device for steering a coupled vehicle substantially in the same direction as the motive vehicle to which it is attached comprising a drawbar having a coupling on its free outer end adapted for attachment to a complemental member fixed on the axis of symmetry of the motive vehicle, said coupling and complemental member having movement relative to each other only in response to irregularities in the surface over which it travels but having unitary movement in response to a turning moment applied in the direction of turn of the motive vehicle, the other end of the drawbar terminating in a pair of arms extending parallel to the drawbar and spaced equi-distant therefrom, a pivotal member attachable to the coupled vehicle centrally on the axis of symmetry and having a component on each side of said axis, each component being angulated relative to said axis, the two components forming an included angle bisected by the said axis and the opening of which angle faces in the direction of motion of the motive vehicle, a pivotal mounting for said member permitting said member to move in response to a reversal in the direction of motion of the motive vehicle to form a negative included angle opposite to the first mentioned included angle, a glide pivotally mounted on the free end of each arm slidably connecting the arms to the components, whereby during a straight line motion of the motive vehicle the drawbar is in line with the axis of symmetry bisecting the included angle whereby no turning moment is applied to the components and during a curvilinear motion of the motive vehicle the drawbar will be shifted laterally by the complemental member to apply a turning moment to the components in the direction of turn of the motive vehicle and thereby steer the coupled vehicle substantially along the course of the motive vehicle, and an interlock operatively connected to said drawbar for positively locking said member in the position which it assumes by the line force applied thereto.

5. A vehicular coupling-steering device for the steering of a coupled vehicle substantially in the same direction as the motive vehicle to which it is attached, comprising a drawbar having a coupling on its free outer end adapted for attachment to a complemental part fixed on the axis of symmetry of the motive vehicle, said coupling and complemental part having movement relative to each other only in response to irregularities in the surface over which the vehicles travel but having unitary movement in response to a turning moment of the motive vehicle, a pivotal member attached to the coupled vehicle centrally on the axis of symmetry and having a component on each side of said axis, each component being angulated relative to said axis, the two components forming an included angle bisected by the said axis which angle faces in the direction of motion of the motive vehicle, a pivotal mounting for said member permitting said member to move in response to a reversal in the direction of motion of the motive vehicle to form a negative included angle opposite to the first mentioned included angle, means for slidably and pivotally connecting the other end of the drawbar to the components on each side of the axis of symmetry equi-distant from the drawbar and parallel thereto, whereby during straight line motion of the motive vehicle the drawbar is in line with the axis of symmetry bisecting the included angle with no turning moment applied to the components and during a curvilinear motion of the motive vehicle the drawbar wil lshift laterally to apply a turning moment to the components in the direction of turn of the motive vehicle and thereby steer the coupled vehicle substantially along the course of the motive vehicle, and an interlock operatively connected to said drawbar for positively locking said member in the position which it assumes by the line force applied thereto.

6. A vehicular steering-coupling device for steering a coupled vehicle in the direction of a motive vehicle to which it is coupled comprising a drawbar having a coupling on its free outer end adapted for attachment to a complemental member fixed on the axis of symmetry of the motive vehicle, said coupling and complemental member having movement relative to each other only in response to irregularities in the surface over which the vehicles travel but having unitary movement in response to a turning moment applied laterally in the direction of turn of the motive vehicle, the other end of the drawbar terminating in a crossbar and a pair of arms extending parallel to the drawbar and equi-distant therefrom, a member attachable to the towed vehicle centrally on the axis of symmetry and having a component on each side of said axis, each component being angulated relative to said axis, the two components forming an included angle bisected by the said axis and the opening of which angle faces in the direction of motion of the motive vehicle, and means for slidably and pivotally connecting the arms to the adjacent portion of the components of the member, whereby during a straight line motion of the motive vehicle the drawbar is in line with the axis of symmetry bisecting the included angle and no turning moment is applied to the fixed member, and during a curvilinear motion of the motive vehicle the drawbar will be shifted laterally by the complemental member to apply a turning moment to the components in the direction of turn of the motive vehicle and thereby steer the coupled vehicle substantially along the curve described by the motive vehicle.

7. A vehicular steering-coupling device for steering a coupled vehicle substantially in the same direction of the motive vehicle to which it is attached comprising a drawbar having a coupling on its free outer end adapted for attachment to a complemental member fixed on the axis of symmetry of the motive vehicle, said coupling and complemental member having movement relative to each other only in response to irregularities in the surface over which the vehicles travel but having unitary movement in response to a turning moment applied laterally in the direction of turn of the motive vehicle, a crossbar fixed on the other end of the drawbar terminating in a pair of arms extending parallel to the drawbar and equi-distant therefrom, a member mounted on each side of the axis of symmetry, each member being angulated relative to said axis and forming an included angle bisected by the said axis the opening of which angle faces in the direction of motion of the motive vehicle, means carried on each arm for slidably and pivotally connecting it to the contiguous member, whereby during a straight line motion of the motive vehicle the drawbar is in line with the axis of symmetry bisecting the included angle whereby no turning moment is applied to the members and during a curvilinear motion of the motive vehicle the drawbar will be shifted laterally by the complemental member to apply a turning moment to the members in the direction of turn of the motive vehicle and thereby steer the coupled vehicle substantially along the curve described by the motive vehicle.

8. A vehicular steering-coupling device for steering a coupled vehicle in the same direction as the motive vehicle to which it to coupled comprising a drawbar having a coupling on its free outer end adapted for attachment to a complemental member fixed on the axis of symmetry of the motive vehicle, said coupling and complemental member having movement relative to each other only in response to irregularities in the surface over which the vehicles travel but having unitary movement in response to a turning moment applied in the direction of turn of the motive vehicle, a crossbar fixed on the other end of the drawbar at right angles thereto and having an arm at each end equi-distant from and parallel to the drawbar, a base arranged for attachment to the coupled vehicle on the longitudinal axis of symmetry, a member mounted on said base and positioned centrally on the axis of symmetry and having a component on each side of said axis, each component being angulated relative to said axis, the two components forming an included angle bisected by the said axis and the opening of which angle faces in the direction of motion of the motive vehicle, and means carried on each arm slidably connecting it to the contiguous component of the member whereby during a straight line motion of the motive vehicle the drawbar is in line with the axis of symmetry bisecting the included angle whereby no turning moment is applied to the components and during a curvilinear motion of the motive vehicle the drawbar will be shifted laterally by the complemental member to apply a turning moment to the components in the direction of turn of the motive vehicle and thereby steer the coupled vehicle substantially along the course of the motive vehicle.

9. A vehicular steering-coupling device for steering a coupled vehicle substantially in the same direction as the motive vehicle to which it is attached comprising a drawbar having a coupling on its free outer end adapted for attachment to a complemental member fixed on the axis of symmetry of the motive vehicle, said coupling and complemental member having movement relative to each other only in response to irregularities in the surface over which it travels but having unitary movement in response to a turning moment applied in the direction of turn of the motive vehicle, the other end of the drawbar terminating in a pair of arms extending parallel to the drawbar and spaced equi-distant therefrom, a member attachable to the coupled vehicle centrally on the axis of symmetry and having a component on each side of said axis, each component being angulated relative to said axis, the two components forming an included angle bisected by the said axis and the opening of which angle faces in the direction of motion of the motive vehicle, and a glide pivotally mounted on the free end of each arm slidably connecting the arms to the components, whereby during a straight line motion of the motive vehicle the drawbar is in line with the axis of symmetry bisecting the included angle whereby no turning moment is applied to the components and during a curvilinear motion of the motive vehicle the drawbar will be shifted laterally by the complemental member to apply a turning moment to the components in the direction of turn of the motive vehicle and thereby steer the coupled vehicle substantially along the course of the motive vehicle.

10. A vehicular coupling-steering device for the steering of a coupled vehicle substantially in the same direction as the motive vehicle to which it is attached, comprising a drawbar having a coupling on its free outer end adapted for attachment to a complemental part fixed on the axis of symmetry of the motive vehicle, said coupling and complemental part having movement relative to each other only in response to irregularities in the surface over which the vehicles travel but having unitary movement in response to a turning moment of the motive vehicle, a member attached to the coupled vehicle centrally on the axis of symmetry and having a component on each side of said axis, each component being angulated relative to said axis, the two components forming an included angle bisected by the said axis which angle faces in the direction of motion of the motive vehicle, and means slidably and pivotally connecting the other end of the drawbar to the components on each side of the axis of symmetry equi-distant from the drawbar and parallel thereto, whereby during straight line motion of the motive vehicle the drawbar is in line with the axis of symmetry bisecting the included angle with no turning moment applied to the components and during a curvilinear motion of the motive vehicle the drawbar will shift laterally to apply a turning moment to the components in the direction of turn of the motive vehicle and thereby steer the coupled vehicle substantially along the course of the motive vehicle.

References Cited in the file of this patent

UNITED STATES PATENTS

| | | |
|---|---|---|
| 2,524,312 | Garnett | Oct. 3, 1950 |
| 2,768,837 | Prater | Oct. 30, 1956 |